Oct. 18, 1955  O. BORUVKA  2,720,699
CARVING FORK
Filed June 26, 1952
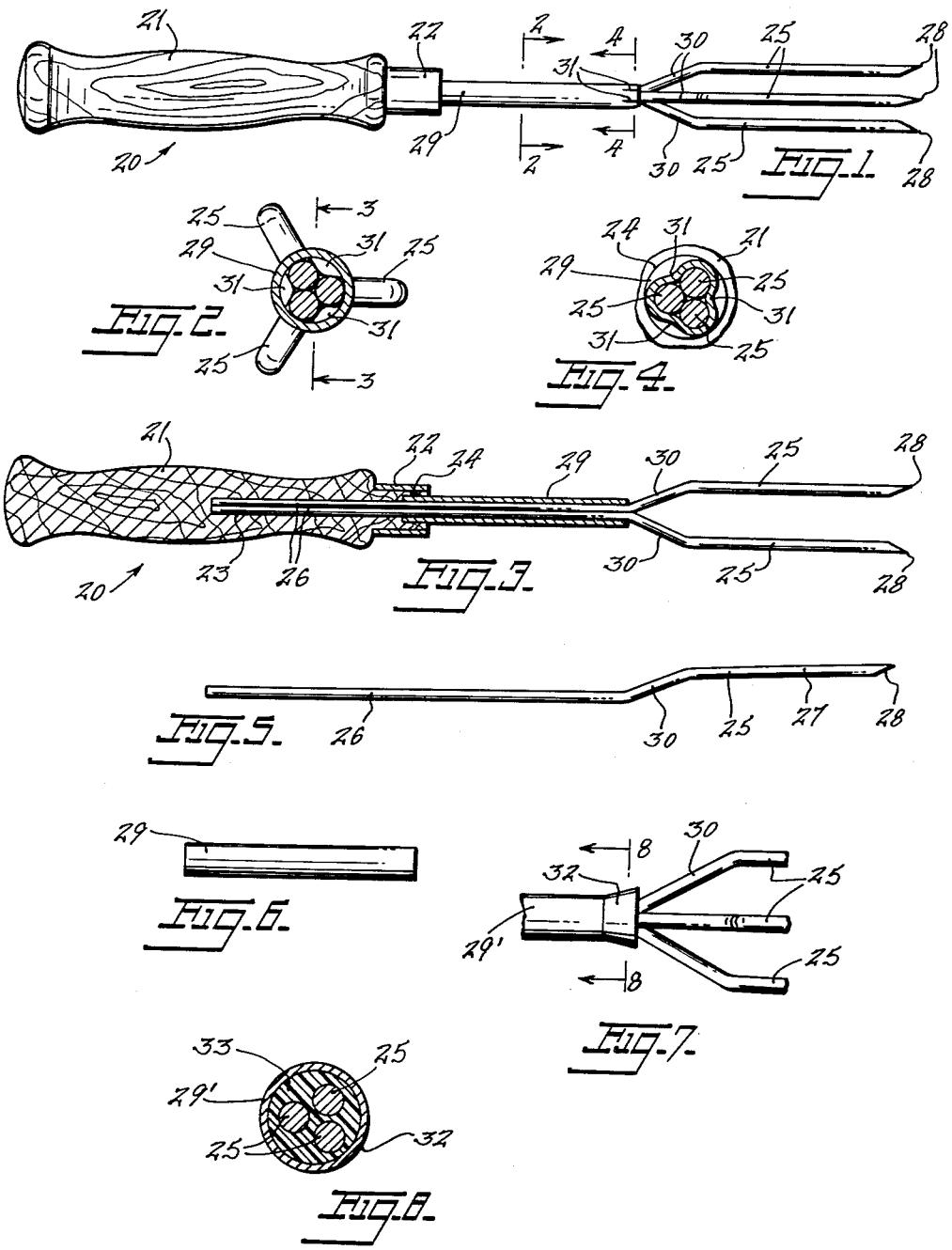
INVENTOR.
OTTO BORUVKA
BY
ATTORNEY

United States Patent Office 2,720,699
Patented Oct. 18, 1955

2,720,699

CARVING FORK

Otto Boruvka, New York, N. Y.

Application June 26, 1952, Serial No. 295,653

1 Claim. (Cl. 30—322)

This invention relates to carving or serving forks and particularly concerns novel means for shaping and arranging the several portions thereof.

It is an object of the present invention to provide a fork assembled from a plurality of parts so shaped and arranged that the fork may be fabricated in a manner more economical and simple than heretofore known.

It is a further object to provide a fork having a plurality of individual tines joined in a novel manner to form a fork.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a fork constructed in accordance with the invention.

Fig. 2 is a sectional view taken on lines 2—2 of Fig. 1.

Fig. 3 is a sectional view taken on lines 3—3 of Fig. 2 and is also a longitudinal section of the fork of Fig. 1.

Fig. 4 is a sectional view taken on lines 4—4 of Fig. 1.

Fig. 5 is a plan view of one tine element of the fork of Fig. 1.

Fig. 6 is a plan view of a tube employed in assembling the fork of Fig. 1.

Fig. 7 is a fragmentary plan view of a modified form of Fig. 2 for joining the tine elements of the fork.

Fig. 8 is a sectional view taken on lines 8—8 of Fig. 7.

In Figs. 1 to 4 is shown a fork having a handle 21 of wood, plastic or other suitable material. At one end of the handle is a cylindrical ferrule 22 cemented to the handle. A bore 23 is centrally located in the ferrule end of the handle. The bore 23 has a slightly enlarged recess 24 at the end thereof. A plurality of tines 25 having pointed ends 28 are assembled in a cylindrical tube 29 with straight juxtaposed ends 26 projecting from the tube. In the embodiment shown in Figs. 1 to 4 three tines are assembled in the cylindrical tube 29 shown diagrammatically in Fig. 6. In accordance with the invention two or more tines may be assembled in the cylindrical tube as shown in Figs. 1 and 3. A typical form of tine 25 is shown in Fig. 5. The tine is formed from a cylindrical rod having a straight portion 26, and an offset portion 27 formed by bending the rod adjacent the center thereof at an intermediate portion 30.

In order to secure the tines in a desired position at a predetermined angle to each other, the juxtaposed parts of straight portions 26 are cemented together, and the end of tube 29 is crimped at 31 around the tines adjacent the bent tine portions 30. The end of tube 29 opposite the crimped end is wedged firmly into the recess 24 in handle 21 while the ends 26 of tines 25 extending from tube 29 are firmly wedged in bore 23. The fork 20 as thus constituted is admirably adapted for serving spaghetti, for use as a holding fork during carving of meats and for similar purposes.

An alternative means for anchoring the tines at the end of tube 29, is shown in Figs. 7 and 8. Tube 29' has a flared end 32 in which is inserted a plug 33 of plastic, metal or other suitable material. The plug has a number of holes therein equal to the number of tines to be inserted therethrough. The plug 33 is wedged into the flared end of tube 29'. Although the tines are shown as formed of round rods they may of course be formed of rods having square, rectangular, oval, or other shaped cross sections. It is also to be noted that the symmetrical arrangement of tines 25 enables a meat carver to carve equally well on all sides of the fork. In addition, any pair of tines may be used as a knife guiding edge.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A fork comprising a handle having a longitudinal bore therein with an enlarged recess at one end, a cluster of three tines symmetrically disposed at the corners of an equilateral triangle, each tine being formed from an individual rod having a bend at an intermediate portion thereof, the ends of the tines extending into said bore, an elongated cylindrical tube surrounding said tines, one end of said tube extending into the recess in said handle, the other end of said tube terminating at the bends in said tines, said tube being flared outwardly at said other end, and a perforated plug of similar shape wedged in said flared end to receive and secure said tines in position.

References Cited in the file of this patent

UNITED STATES PATENTS

| | | |
|---|---|---|
| D. 28,444 | Richardson | Apr. 5, 1898 |
| 54,514 | Dungin | May 8, 1866 |
| 812,771 | Reddick | Feb. 13, 1906 |
| 1,539,669 | Hauser | May 26, 1925 |
| 1,809,254 | Smith | June 9, 1931 |
| 2,595,597 | Morseth | May 6, 1952 |

FOREIGN PATENTS

| | | |
|---|---|---|
| 382,319 | Great Britain | Oct. 27, 1932 |
| 476,756 | Great Britain | Dec. 15, 1937 |
| 695,300 | Germany | Aug. 22, 1940 |